(12) United States Patent
Hou et al.

(10) Patent No.: US 11,852,751 B2
(45) Date of Patent: Dec. 26, 2023

(54) METHOD, APPARATUS, COMPUTING DEVICE AND COMPUTER-READABLE STORAGE MEDIUM FOR POSITIONING (71) Applicant: Beijing Baidu Netcom Science and Technology Co., Ltd., Beijing (CN)

(72) Inventors: Shenhua Hou, Beijing (CN); Wendong Ding, Beijing (CN); Hang Gao, Beijing (CN); Guowei Wan, Beijing (CN); Shiyu Song, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 272 days.

(21) Appl. No.: 16/806,442

(22) Filed: Mar. 2, 2020

(65) Prior Publication Data
US 2021/0270612 A1 Sep. 2, 2021

(51) Int. Cl.
*G01C 21/30* (2006.01)
*G01S 17/42* (2006.01)
(Continued)

(52) U.S. Cl.
CPC ............ *G01S 7/4808* (2013.01); *G01C 21/30* (2013.01); *G01S 17/42* (2013.01); *G01S 17/89* (2013.01); *G06F 18/251* (2023.01)

(58) Field of Classification Search
CPC ......... G01C 21/30; G01S 17/42; G01S 17/89; G06K 9/6289
(Continued)

(56) References Cited

U.S. PATENT DOCUMENTS

2007/0299603 A1* 12/2007 Kirby ................. G01C 21/28
 701/408
2019/0301873 A1* 10/2019 Prasser .............. G01C 21/3848
(Continued)

FOREIGN PATENT DOCUMENTS

AU 2018282435 B1 2/2020
CN 108326845 A 7/2018
(Continued)

OTHER PUBLICATIONS

Wan et al., "Robust and Precise Vehicle Localization based on Multi-sensor Fusion in Diverse City Scenes," arXiv:1711.05805v2 [cs.CV]. Mar. 6, 2020, 8 pages.
(Continued)

*Primary Examiner* — Russell Frejd
*Assistant Examiner* — Matthias S Weisfeld
(74) *Attorney, Agent, or Firm* — Seed IP Law Group LLP (57) ABSTRACT

The present disclosure provides a method, an apparatus, a computer device and a computer-readable storage medium for positioning, and relates to the field of autonomous driving. The method obtains point cloud data collected by a LiDAR on a device at a current time; determines, based on the point cloud data and a global map built in a global coordinate system, global positioning information of the device in the global coordinate system at the current time; and determine, based on the point cloud data and a local map built in a local coordinate system, local positioning information of the device in the local coordinate system at the current time. A positioning result of the device at the current time is determined based on at least the global positioning information and the local positioning information. Techniques of the present disclosure can provide an effective and stable positioning service.

18 Claims, 4 Drawing Sheets

(51) Int. Cl.
  *G01S 17/89*  (2020.01)
  *G01S 7/48*  (2006.01)
  *G06F 18/25*  (2023.01)

(58) Field of Classification Search
  USPC .......................................................... 701/49
  See application file for complete search history.

(56) References Cited

U.S. PATENT DOCUMENTS

| | | | |
|---|---|---|---|
| 2019/0310651 | A1* | 10/2019 | Vallespi-Gonzalez ...................... G05D 1/0221 |
| 2019/0323843 | A1 | 10/2019 | Yu et al. |
| 2020/0035099 | A1* | 1/2020 | Sivakumar ............. G08G 1/056 |
| 2020/0089251 | A1* | 3/2020 | Golestan Irani ... G01C 21/3848 |
| 2020/0150233 | A1* | 5/2020 | Nian ..................... G01S 7/4808 |
| 2020/0349362 | A1* | 11/2020 | Maloney ................... G01S 5/16 |
| 2020/0379481 | A1* | 12/2020 | Newman ................ G06V 20/56 |

FOREIGN PATENT DOCUMENTS

| | | | |
|---|---|---|---|
| CN | 108732584 | A | 11/2018 |
| CN | 108985230 | * | 12/2018 |
| CN | 109059906 | A | 12/2018 |
| CN | 109848988 | A | 6/2019 |
| CN | 110553648 | A | 12/2019 |
| CN | 110554396 | A | 12/2019 |
| CN | 110689576 | A | 1/2020 |
| CN | 110737009 | A | 1/2020 |
| JP | 2014-102137 | A | 6/2014 |
| WO | 2018/008082 | A1 | 1/2018 |
| WO | 2019/215987 | A1 | 11/2019 |

OTHER PUBLICATIONS

Ye et al., "Tightly Coupled 3D Lidar Inertial Odometry and Mapping," arXiv:1904.06993v1 [cs.RO], Apr. 15, 2019, 7 pages.

* cited by examiner

METHOD, APPARATUS, COMPUTING DEVICE AND COMPUTER-READABLE STORAGE MEDIUM FOR POSITIONING

FIELD

Embodiments of the present disclosure mainly relate to the field of autonomous driving, and more specifically to a method, an apparatus, a computer device and a computer-readable storage medium for positioning.

BACKGROUND

As an application scenario of the artificial intelligence, autonomous driving (also known as unmanned driving) has recently become a new direction for various transportation means, especially the automobile industry. The autonomous driving technology usually relies on high-precision positioning of autonomous vehicles. In the autonomous driving field, traditional positioning schemes usually determine a location of an autonomous vehicle by matching point cloud data collected in real time by a LiDAR on the autonomous vehicle with a high-precision positioning map. However, when the road environment changes, the point cloud data collected in real time may greatly differ from the data of a corresponding area in the positioning map, which results in inaccurate positioning results or failure of positioning.

SUMMARY

According to example embodiments of the present disclosure, there is provided a solution for positioning.

In a first aspect of the present disclosure, there is provided a method for positioning. The method comprises obtaining point cloud data collected by a LiDAR on a device to be positioned at a current time; determining, based on the point cloud data and a global map built in a global coordinate system, global positioning information of the device in the global coordinate system at the current time; determining, based on the point cloud data and a local map built in a local coordinate system, local positioning information of the device in the local coordinate system at the current time; and determining, based on at least the global positioning information and the local positioning information, a positioning result of the device at the current time.

In a second aspect of the present disclosure, there is provided an apparatus for positioning. The apparatus comprises a first obtaining module configured to obtain point cloud data collected by a LiDAR on a device to be positioned at a current time; a global positioning module configured to determine, based on the point cloud data and a global map built in a global coordinate system, global positioning information of the device in the global coordinate system at the current time; a local positioning module configured to determine, based on the point cloud data and a local map built in a local coordinate system, local positioning information of the device in the local coordinate system at the current time; and a result determining module configured to determine, based on at least the global positioning information and the local positioning information, a positioning result of the device at the current time.

In a third aspect of the present disclosure, there is provided a computing device comprising one or more processors; and a memory for storing one or more programs which, when executed by the one or more processors, cause the computing device to perform the method according to the first aspect of the present disclosure.

In a fourth aspect of the present disclosure, there is provided a computer-readable storage medium having stored thereon a computer program that, when executed by a device, causes the device to perform the method according to the first aspect of the present disclosure.

It is to be understood that the content described in the Summary of the present disclosure is not intended to define key or essential features of embodiments of the present disclosure, nor is it intended to limit the scope of the present disclosure. Other features of the present disclosure will be easily understood by the following depictions.

BRIEF DESCRIPTION OF THE DRAWINGS

In conjunction with the accompanying drawings and with reference to the following detailed description, the above and other features, advantages, and aspects of embodiments of the present disclosure will become more apparent. In the drawings, identical or like reference numbers denote identical or like elements, in which.

DETAILED DESCRIPTION

Hereinafter, embodiments of the present disclosure will be described in more detail with reference to the accompanying drawings. Although some embodiments of the present disclosure are illustrated in the drawings, it is to be understood that the present disclosure may be implemented in various manners and should not be interpreted as being limited to the embodiments illustrated herein. On the contrary, these embodiments are only intended to understand the present disclosure more thoroughly and completely. It is to be understood that the accompanying drawings and embodiments of the present disclosure are only for the purpose of illustration, without suggesting any limitation to the protection scope of the present disclosure.

As described in embodiments of the present disclosure, the terms "includes", "comprises" and its variants are to be read as open-ended terms that mean "includes, but is not limited to." The term "based on" is to be read as "based at least in part on." The term "one embodiment" or "the embodiment" should be understood as "at least one embodiment". The terms "first", "second", etc. may refer to different or the same objects. The following text also can include other explicit and implicit definitions.

As mentioned above, in the autonomous driving field, traditional positioning schemes usually determine a location of an autonomous vehicle by matching point cloud data collected in real time by a LiDAR on the autonomous vehicle with a high-precision positioning map. However, when road environment changes, the point cloud data collected in real time may greatly differ from the data of a corresponding area in the positioning map, which results in inaccurate positioning results or failure of positioning.

According to embodiments of the present disclosure, a solution for positioning is proposed. This solution comprises obtaining point cloud data collected by a LiDAR on a device to be positioned at a current time; determining, based on the point cloud data and a global map built in a global coordinate system, global positioning information of the device in the global coordinate system at the current time; determining, based on the point cloud data and a local map built in a local coordinate system, local positioning information of the device in the local coordinate system at the current time; and determining, based on at least the global positioning information and the local positioning information, a positioning result of the device at the current time. In this way, embodiments of the present disclosure can provide an effective and stable positioning service, so that the positioning result is not affected by environmental changes.

Figure 1:
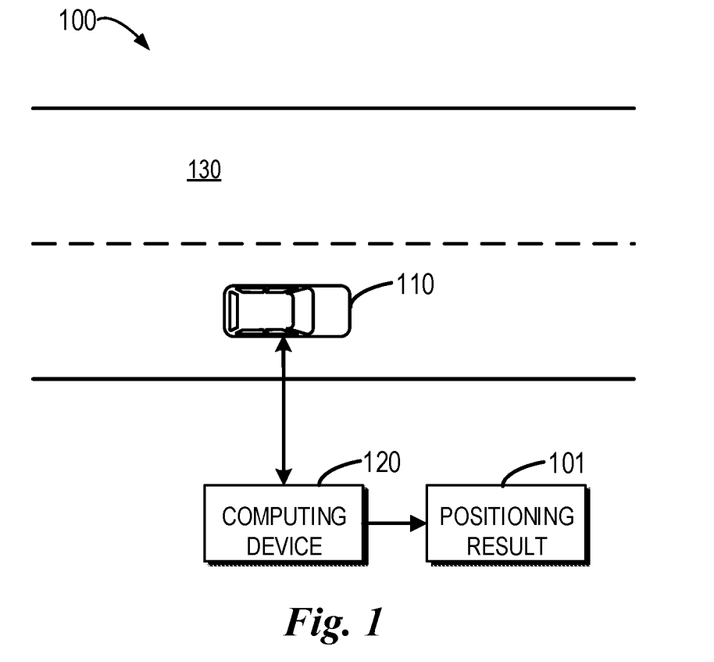
FIG. 1 illustrates a schematic diagram of an example environment in which embodiments of the present disclosure can be implemented.

Embodiments of the present disclosure will be specifically described below with reference to the figures. FIG. 1 illustrates a schematic diagram of an example environment 100 in which embodiments of the present disclosure can be implemented. The environment 100 may include a device 110 to be positioned and a computing device 120 communicatively coupled to the device 110.

In this example environment 100, the device 110 is shown as a vehicle, which is for example driving on a road 130. The vehicle described herein may include, but is not limited to, a car, a truck, a bus, an electric vehicle, a motorcycle, a motor home, a train and the like.

In some embodiments, the device 110 may be a vehicle with partially or fully autonomous driving capabilities, also referred to as an unmanned vehicle. Alternatively, in other embodiments, the device 110 may also be other devices or transportation vehicles to be positioned. The scope of the present disclosure is not limited in this regard.

The device 110 may be communicatively coupled to the computing device 120. Although shown as a separate entity, the computing device 120 may be embedded in the device 110. The computing device 120 may also be implemented as an entity external to the device 110 and may communicate with the device 110 via a wireless network. The computing device 120 may include at least a processor, a memory, and other components generally present in a general-purpose computer, so as to implement functions such as computing, storage, communication, control and so on.

In some embodiments, the device 110 may be equipped with a LiDAR for collecting point cloud data in real time. The computing device 120 may obtain point cloud data collected by the LiDAR in real time from the device 110, and determine a current positioning result 101 of the device 110 based on at least the point cloud data. The positioning result 101 may indicate a pose of the device 110 in a specific coordinate system. For example, in a two-dimensional coordinate system, the pose of an object may be represented with two-dimensional coordinates and a heading angle. In a three-dimensional coordinate system, the pose of an object may be represented with three-dimensional coordinates, a pitch angle, a heading angle and a roll angle. Additionally, in some embodiments, the device 110 may also be equipped with an inertial measurement unit (IMU) for collecting inertial measurement data, such as angular velocity collected by a gyroscope, a zero offset of the gyroscope, acceleration collected by an accelerator and a zero offset of the accelerator, in real time. The computing device 120 may obtain the inertial measurement data and the point cloud data collected by the LiDAR in real time from the device 110, and determine the current positioning result 101 of the device 110 based on at least the inertial measurement data and the point cloud data.

Figure 2:
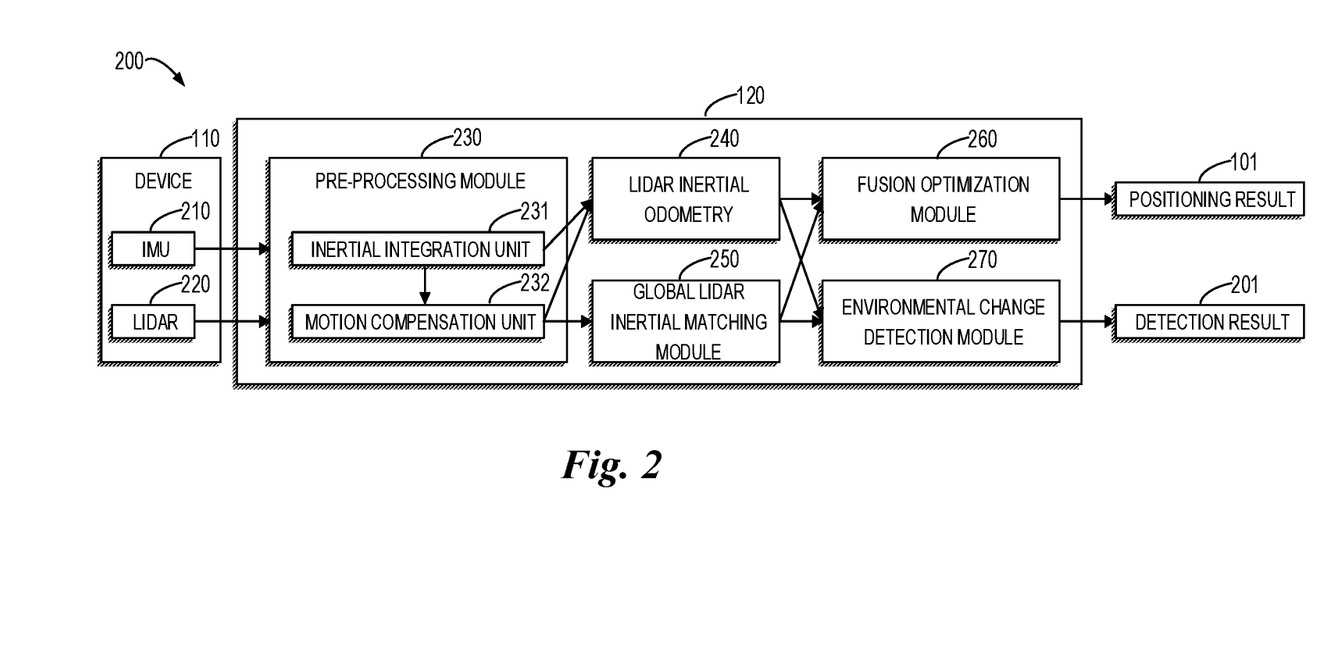
FIG. 2 illustrates a block diagram of a positioning system according to embodiments of the present disclosure.

FIG. 2 illustrates a block diagram of a positioning system 200 according to embodiments of the present disclosure. It should be understood that the structure and function of the positioning system 200 are shown merely for the purpose of illustration, without suggesting any limitation to the scope of the present disclosure. In some embodiments, the positioning system 200 may have different structures and/or functions.

As shown in FIG. 2, the system 200 may include the device, e.g., a vehicle, 110 to be positioned and the computing device 120. The device 110 to be positioned for example may include an inertial measurement unit "IMU" 210 and a Lidar system "LiDAR" 220. The IMU 210, for example, a gyroscope, an accelerometer, a magnetometer, a satellite-based positioning sensor like GPS sensor, and/or other inertial sensors, may collect inertial measurement data of the device 110, such as angular velocity collected by the gyroscope, a zero offset of the gyroscope, acceleration collected by the accelerator, a zero offset of the accelerator, and etc., in real time, and the LiDAR 220 may collect point cloud data in real time. As used herein, the "point cloud data" refers to data information of various points on the surface of an object returned when a laser beam is irradiated on the surface of the object, including three-dimensional coordinates, for example, x, y and z coordinates, and laser reflection intensity, also referred to as "reflection value", of each point.

As shown in FIG. 2, the computing device 120 may include a pre-processing module 230, a LiDAR inertial odometry 240, a global LiDAR inertial matching module 250, a fusion optimization module 260 and an environmental change detection module 270. It is to be understood that the various modules of the computing device 120 and their functions are shown only for the purpose of illustration, without suggesting any limitation to the scope of the present disclosure. In some embodiments, the computing device 120 may include an additional module, or one or more of the modules as shown, e.g., the environmental change detection module 270, may be omitted.

In some embodiments, the pre-processing module 230 may include an inertial integration unit 231 and a motion compensation unit 232. The inertial integration unit 231 may integrate the inertial measurement data collected by the IMU 210 to determine positioning information, also referred to herein as "inertial positioning information," of the device 110 in an inertial coordinate system at the current time. The inertial positioning information, for example, may indicate a predicted pose and/or other information of the device 110 in the inertial coordinate system. In some embodiments, the inertial positioning information may be provided to the motion compensation unit 232, and the motion compensation unit 232 may use the inertial positioning information to perform motion compensation on the original point cloud data collected by the LiDAR 220 to obtain the compensated point cloud data. The compensated point cloud data may be provided to the LiDAR inertial odometry 240 and the global LiDAR inertial matching module 250.

In some embodiments, the global LiDAR inertial matching module 250 may determine, by matching the point cloud data, e.g., the motion-compensated point cloud data, with a pre-built global positioning map, current positioning information, also referred to herein as "global positioning information," of the device 110 in the global positioning map. The global positioning map may be a two-dimensional map built in the global coordinate system which is, for example, a world coordinate system indicating latitude and longitude. In some embodiments, the global positioning map may be divided into a plurality of grids on a two-dimensional plane, where each grid may record a laser reflection value and a height value corresponding to the grid. In some embodiments, the global LiDAR inertial matching module 250 may use a histogram filter framework, which uses the reflection value and height value in the real-time point cloud data to match the reflection value and height value of each grid to update a state probability in the histogram filter. In some embodiments, the global positioning information output by the global LiDAR inertial matching module 250 may include a pose, also referred to herein as a "first pose," of the device 110 in the global coordinate system and a confidence level, for example, a state probability, of the pose.

The LiDAR inertial odometry 240 may be used to improve positioning accuracy in a scenario such as road construction, map expiration or environmental changes. In some embodiments, the LiDAR inertial odometry 240 may receive point cloud data, e.g., the motion-compensated point cloud data or the original point cloud data, and estimate a relative pose relationship between the point cloud data, also referred to as "a current frame," at the current time and point cloud data, also referred to as "a previous frame," at a previous time. The LiDAR inertial odometry 240 may construct a local map in a local coordinate system by combining the received point cloud data based on the estimated relative pose relationships among different frames. For example, the local map may be a two-dimensional map or a three-dimensional map built in the local coordinate system with an initial position of the device 110 as an origin. In the following, a three-dimensional map will be taken as an example of the local map.

In some embodiments, in response to receiving point cloud data (e.g., the motion-compensated point cloud data or the original point cloud data) at the current time, the LiDAR inertial odometry 240 may determine, by matching the point cloud data with the local map, positioning information, also referred to herein as "local positioning information," of the device 110 in the local map at the current time. For example, the local positioning information may indicate a relative pose between the point cloud data and the local map, a pose of the device 110 in the local coordinate system, also referred to as "a second pose" herein, and a pose of the local map in the local coordinates system, also referred to as "a third pose" herein. The pose of the local map may be represented, for example, by the pose corresponding to the first frame of point cloud used to construct the local map.

In some embodiments, the LiDAR inertial odometry 240 may further update the local map based on the point cloud data at the current time. Since the point cloud data and the local map are usually not in the same coordinate system, the LiDAR inertial odometry 240 may first transform the point cloud data to the local coordinate system corresponding to the local map, and then update the local map with the coordinate-transformed point cloud data. For example, the LiDAR inertial odometry 240 may insert the point cloud data of the current time into the local map to update the local map.

In some embodiments, the LiDAR inertial odometry 240 may maintain a plurality of local maps. For example, it is assumed that the LiDAR inertial odometry 240 has built a first local map by combining a plurality of frames of historical point cloud data. Upon receiving the point cloud data of the current time, the LiDAR inertial odometry 240 may insert the point cloud data of the current time into the first local map to update the first local map. If the number of point cloud frames in the first local map reaches a threshold (for example, 40 frames), subsequent point cloud data will not be inserted into the first local map and will be used to construct a new second local map. If the number of point cloud frames in the second local map reaches a threshold, for example, 40 frames, the first local map may be discarded. In some embodiments, the plurality of local maps maintained by the LiDAR inertial odometry 240 may have different resolutions, thereby further improving the accuracy and stability of positioning. In some embodiments, when the LiDAR inertial odometry 240 maintains a plurality of local maps, the pose of each local map in the local coordinate system may be represented by the pose corresponding to the first frame of point cloud used to construct the local map. Upon determining the local positioning information, the LiDAR inertial odometry 240 may match the received point cloud data with part or all of the plurality of local maps.

In some embodiments, the fusion optimization module 260 may fuse the local positioning information from the LiDAR inertial odometry 240 and the global positioning information from the global LiDAR inertial matching module 250 to determine the current positioning result 101 of the device 110. The positioning result 101 may indicate the pose of the device 110 in the global coordinate system or the local coordinate system at the current time. Because the LiDAR inertial odometry 240 can provide good relative constraints in the local coordinate system and the global LiDAR inertial matching module 250 can provide global constraints to achieve global positioning, the fusion of the positioning results of the two may provide a stable positioning system. Additionally, in some embodiments, the fusion optimization module 260 may fuse the local positioning information from the LiDAR inertial odometry 240, the global positioning information from the global LiDAR inertial matching module 250 and the inertial positioning information from the inertial integration unit 231 to determine the current positioning result 101 of the device 110.

In some embodiments, the fusion process may utilize a sliding window of a fixed length. For example, in the case that the number of frames in the sliding window reaches a predetermined number of frames, when a new frame of point cloud data enters the sliding window, the oldest frame of point cloud data in the sliding window may be removed. That is, the sliding window used for the fusion process always includes point cloud data at the current time, e.g., the current frame, and point cloud data at historical times before the current time.

In some embodiments, the fusion optimization module 260 may use the positioning information from the global LiDAR inertial matching module 250 and the LiDAR inertial odometry 240 as inputs for the sliding window to optimize the positioning result 101 of the device 110 at the current time, e.g., to derive a final pose corresponding to the current frame.

In some embodiments, the fusion problem may be formulated into a maximum posterior probability estimation problem. For example, a posterior probability P(X/Z) corresponding to the positioning result of the device 110 may be decomposed as follows:

$$P(X \mid \mathcal{Z}) \propto \prod_{k,s} P(z_{ks}^O \mid x_k^I, x_s^S) \prod_k P(z_k^I \mid x_k^I, x_{k-1}^I) \prod_k P(z_k^G \mid x_k^I, x_L^G). \quad (1),$$

where $\mathcal{K}$ represents all frames in the sliding window, $\mathcal{X}=\{x_k\}_{k\in\mathcal{K}}$ represents states of these frames, e.g., positioning results, and $\mathcal{Z}=\{z_k\}_{k\in\mathcal{K}}$ represents measurement data, including inertial positioning information provided by the inertial integration unit 231, the global positioning information provided by the global LiDAR inertia matching module 250 and the local positioning information provided by the LiDAR inertial odometry 240, related to these frames. S represents all local maps maintained by the LiDAR inertial odometry 240, where each of the local maps is represented by s.

In the above formula (1), $z_{ks}^O$ represents a relative pose relationship between the $k^{th}$ frame and the $s^{th}$ local map provided by the LiDAR inertial odometry 240. The variable $x_k^L=[R_k^L, t_k^L]$ represents the state, e.g., pose, of the $k^{th}$ frame in the local coordinate system, where $R_k^L$ represents a pitch angle, a heading angle, and a roll angle corresponding to the $k^{th}$ frame in the local coordinate system, and $t_k^L$ represents three-dimensional position coordinates of the $k^{th}$ frame in the local coordinate system. The variable $x_s^S$ represents a state, e.g., pose, of the $s^{th}$ local map in the local coordinate system. It is to be understood that in the fusion optimization process, the variables $x_k^L$ and $x_s^S$ are variable, while the relative pose relationship $z_{ks}^O$ may remain unchanged. $P(z_{ks}^O|x_k^L, x_s^S)$ represents a likelihood value, also referred to as "a second likelihood value" herein, of the local information provided by the LiDAR inertial odometry 240, which indicates a conditional probability of $z_{ks}^O$ in given states $x_k^L$ and $x_s^S$.

In the above formula (1), $z_k^G$ represents the global positioning information of the $k^{th}$ frame in the global coordinate system provided by the global LiDAR inertial matching module 250. $x_L^G$ represents a transformation relationship between the local coordinate system and the global coordinate system. $P(z_k^G|x_k^L, x_L^G)$ represents a likelihood value (also referred to as "a first likelihood value" herein) of the global positioning information provided by the global LiDAR inertial matching module 250, which indicates a conditional probability of the global positioning information $z_k^G$ in given states $x_k^L$ and $x_L^G$.

In the above formula (1), $z_k^I$ represents the inertial positioning information of the $k^{th}$ frame provided by the inertial integration unit 231 in the inertial coordinate system. The variable $x_{k-1}^L$ represents a state (e.g., a pose) of the $k-1^{th}$ frame in the local coordinate system. It is to be understood that during the fusion optimization, the variables $x_k^L$ and $x_{k-1}^L$ are variable. $P(z_k^I|x_k^L, x_{k-1}^L)$ represents a likelihood value, also referred to as "a third likelihood value" herein, of the inertial positioning information provided by the inertial integration unit 231, which indicates a conditional probability of the inertial positioning information $z_k^I$ in given states $x_k^L$ and $x_{k-1}^L$.

In some embodiments, assuming that each item in the fusion process conforms to a zero-mean Gaussian distribution, the first likelihood value $P(z_k^G|x_k^L, x_L^G)$, the second likelihood value $P(z_{ks}^O|x_k^L, x_s^S)$ and the third likelihood value $P(z_k^I|x_k^L, x_{k-1}^L)$ may be defined respectively as:

$$\begin{cases} P(z_{ks}^O \mid x_k^L, x_s^S) \propto \exp\left(-\frac{1}{2}\|r_k^O\|_{\Lambda^O}^2\right) \\ P(z_k^I \mid x_k^L, x_{k-1}^L) \propto \exp\left(-\frac{1}{2}\|r_k^I\|_{\Lambda_k^I}^2\right), \\ P(z_k^G \mid x_k^L, x_L^G) \propto \exp\left(-\frac{1}{2}\|r_k^G\|_{\Lambda_k^G}^2\right) \end{cases} \quad (2)$$

where $\|r\|\Lambda2=r^T\Lambda^{-1}r$, $r_{ks}^O$, $r_k^I$ and $r_k^G$ represent residuals of the LiDAR inertial odometry 240, the inertial integration unit 231 and the global LiDAR inertial matching module 250, respectively, and $\Lambda^O$ represents a covariance of the residual $r_{ks}^O$ in the local coordinate system, $\Lambda_k^G$ represents a covariance of the residual $r_k^G$ in the global coordinate system, and $\Lambda_k^I$ represents a covariance of the residual $r_k^I$ in the inertial coordinate system.

As stated above, the global positioning information $z_k^G$ provided by the global LiDAR inertial matching module 250 may indicate a first pose $z_k^G$ of the device 110 in the global coordinate system, and the local positioning information provided by the LiDAR inertial odometry 240 may indicate a second pose $x_k^L$ of the device 110 in the local coordinate system.

In some embodiments, in order to determine the first likelihood value $P(z_k^G|x_k^L, x_L^G)$, the fusion optimization module 260 may determine an estimate of the first pose $z_k^G$ based on the transformation relationship $x_L^G$ between the global coordinate system and the local coordinate system and the second pose $x_k^L$, and then determine the residual $r_k^G$ between the estimate and the first pose $z_k^G$ indicated by the global positioning information. For example, assuming the state variable $x_k^L=[R_k^L, t_k^L]$ in the local coordinate system, the transformation relationship between the local coordinate system and the global coordinate system $x_k^G=[R_L^G, t_L^G]$, and the first pose of the device 110 provided by the global LiDAR inertial matching module 250 in the global coordinate system $z_k^G=[R_k^G, t_k^G]$, the residual $(r_k^G)=[Log^T(R_{rG}), t_{rG}^T]$ may be represented as:

$$\begin{bmatrix} R_{rG} & t_{rG} \\ 0 & 1 \end{bmatrix} = \begin{bmatrix} R_k^G & t_k^G \\ 0 & 1 \end{bmatrix}^{-1} \begin{bmatrix} R_L^G & t_L^G \\ 0 & 1 \end{bmatrix} \begin{bmatrix} R_k^L & t_k^L \\ 0 & 1 \end{bmatrix}, \quad (3)$$

where $R_k^L$ represents the pitch angle, the heading angle and the roll angle corresponding to the $k^{th}$ frame in the local coordinate system, and $t_k^L$ represents the three-dimensional position coordinates of the $k^{th}$ frame in the local coordinate system; $R_L^G$ represents a transformation relationship of the pitch angle, the heading angle and the roll angle from the local coordinate system to the global coordinate system, and $t_L^G$ represents a transformation relationship of the three-dimensional position coordinates from the local coordinate system to the global coordinate system; $R_k^G$ represents the pitch angle, the heading angle and the roll angle corresponding to the $k^{th}$ frame in the global coordinate system provided by the global LiDAR inertial matching module 250, and $t_k^G$ represents the three-dimensional position coordinates of the $k^{th}$ frame in the global coordinate system provided by the global LiDAR inertial matching module 250.

In some embodiments, the fusion optimization module 260 may further determine a covariance $\Lambda_k^G$ of the residual $r_k^G$ in the global coordinate system. The covariance $\Lambda_k^G$ of the residual $r_k^G$ in the global coordinate system may be represented as:

$$\Lambda_k^G = \text{diag}(\Lambda^{G_w}, \Lambda_k^{G_h}, \Lambda^{G_z}) \quad (4),$$

where diag( ) represents a diagonal matrix whose diagonal elements are a rotation covariance $\Delta^{G_w}$, an altitude covariance $\Lambda^{G_z}$ and a horizontal covariance $\Lambda_k^{G_h}$. In some embodiments, since the global LiDAR inertial matching module 250 only estimates the uncertainty in the horizontal direction by using the two-dimensional histogram filter, the rotation covariance $\Lambda^{G_w}$ and the altitude covariance $\Lambda^{G_z}$ may be predetermined constants. The two-dimensional histogram filter in the global LiDAR inertial matching module 250 may output the horizontal covariance $\Lambda_k^{G_h}$ of each frame of point cloud data. Therefore, the covariance $\Lambda_k^G$ of the residual $r_k^G$ in the global coordinate system may be determined based on the rotation covariance $\Lambda^{G_w}$, the altitude covariance $\Lambda^{G_z}$ and horizontal covariance $\Lambda_k^{G_h}$. In some embodiments, the fusion optimization module 260 may determine the first likelihood value $P(z_k^G | x_k^L, x_L^G)$ based on the residual $r_k^G$ and the covariance $\Lambda_k^G$ according to the above formula (2).

As described above, the local positioning information provided by the LiDAR inertial odometry 240 may include the relative pose $z_{ks}^O$ between the point cloud data and the local map, the second pose $x_k^L$ of the device 110 in the local coordinate system at the current time, and the third pose $x_s^S$ of the local map in the local coordinate system.

In some embodiments, in order to determine the second likelihood value $P(z_{ks}^O | x_k^L, x_s^S)$, the fusion optimization module 260 may determine an estimate of the relative pose based on the second pose and the third pose provided by the LiDAR inertial odometry 240, and then determine a residual $r_{ks}^O$ between the relative pose $z_{ks}^O$ indicated by the local positioning information and the estimate. For example, assuming the relative pose $z_{ks}^O$ and the pose of the local map $x_s^S = [R_s^S, t_s^S]$, the residual $(r_{ks}^O)^T = [\text{Log}^T(R_{rO}), t_{rO}^T]$ may be represented as:

$$\begin{bmatrix} R_{rO} & t_{rO} \\ 0 & 1 \end{bmatrix} = \begin{bmatrix} R_{ks}^O & t_{ks}^O \\ 0 & 1 \end{bmatrix}^{-1} \begin{bmatrix} R_s^S & t_s^S \\ 0 & 1 \end{bmatrix}^{-1} \begin{bmatrix} R_k^L & t_k^L \\ 0 & 1 \end{bmatrix}, \quad (5)$$

where $R_{ks}^O$ represents a relative pitch angle, a relative heading angle and a relative roll angle of the $k^{th}$ frame with respect to the $s^{th}$ local map, and $t_{ks}^O$ represents the three-dimensional position coordinates of the $k^{th}$ frame in the $s^{th}$ local map; $R_s^S$ represents a pitch angle, a heading angle and a roll angle of the $s^{th}$ local map in the local coordinate system, and $t_s^S$ represents the three-dimensional position coordinates of the $s^{th}$ local map in the local coordinate system.

In some embodiments, the fusion optimization module 260 may further determine the covariance $\Lambda^O$ of the residual $r_{ks}^O$ in the local coordinate system. Specifically, assuming that the uncertainty of the local positioning information is evenly distributed among all frames in the sliding window, the covariance $\Lambda^O$ of the residual $r_{ks}^O$ in the local coordinate system may be a predetermined constant diagonal matrix. In some embodiments, the fusion optimization module 260 may determine the second likelihood value $P(z_{ks}^O | x_k^L, x_s^S)$ according to the above formula (2) based on the residual $r_{ks}^O$ and the covariance $\Lambda^O$.

In some embodiments, the residual $r_k^I$ and the $\Lambda k^I$ of the inertial integration unit 231 may be determined by using any method currently known or to be developed in the future, which will not be described herein again.

In some embodiments, the fusion optimization module 260 may determine the final positioning result 101 of the device 110 at the current time by maximizing the posterior probability shown in formula (1). In some embodiments, for example, the positioning result 101 may indicate the optimized pose $x_k^L$ of the device 110 in the local coordinate system at the current time. Specifically, when solving the maximum posterior estimation problem as shown in formulas (1) and (2), the problem can be transformed into another problem for finding a minimum value of the sum of squares of respective residuals, and then can be solved by using an iterative algorithm.

As shown in FIG. 2, in some embodiments, the environmental change detection module 270 may detect whether the environment where the device 110 is located has changed by matching a local map from the LiDAR inertial odometry 240 with a global map from the global LiDAR inertial matching module 250, and output a detection result 201.

It is to be understood that the accuracy of the global positioning information from the global LiDAR inertial matching module 250 depends on the effectiveness of the pre-built global positioning map. When the map is too old or the environment has changed, it will lead to a situation where the global positioning information has a large error or the positioning cannot be performed. The local map generated in the LiDAR inertial odometry 240 can reflect the current environmental state of the device 110, and has high effectiveness. Therefore, whether the environment where the device 110 is located has changed can be detected by matching the local map from the LiDAR inertial odometry 240 with the global map from the global LiDAR inertial matching module 250.

In some embodiments, the environmental change detection module 270 may project the three-dimensional local map into two-dimensional grids corresponding to the global map, and determine at least one of the grids hit by the local map. Then, the environmental change detection module 270 may determine, for each of the at least one grid, whether the regional environment corresponding to the local map has changed by comparing height values and reflection values between the three-dimensional local map and the global map.

Figure 3:
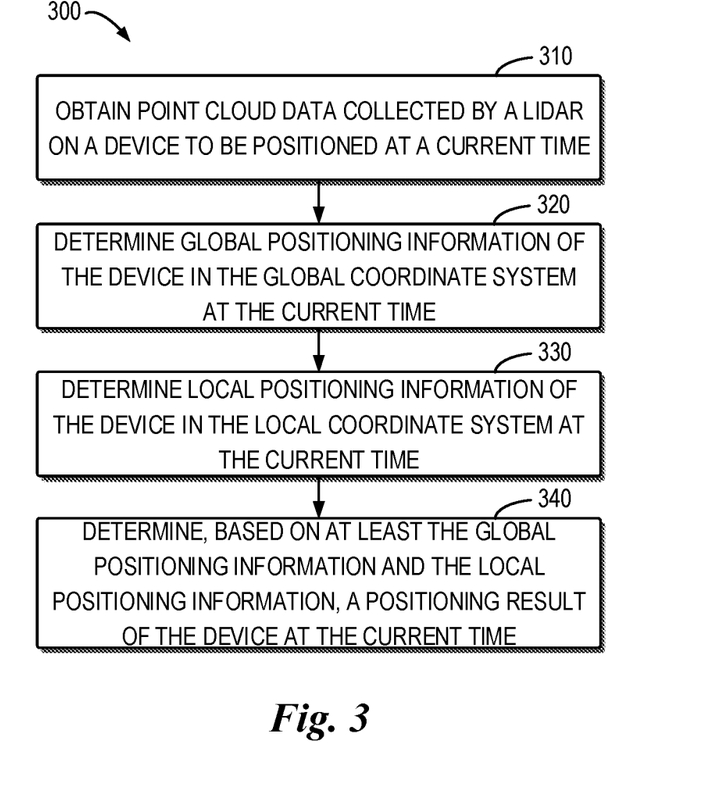
FIG. 3 illustrates a flowchart of a positioning process according to embodiments of the present disclosure.

FIG. 3 illustrates a flowchart of a positioning process 300 according to embodiments of the present disclosure. The process 300 may be implemented by the computing device 120 as shown in FIG. 1. For example, the computing device 120 may be embedded in the device 110 or implemented as an independent device external to the device 110. For ease of discussion, the process 300 will be described with reference to FIG. 2.

At block 310, the computing device 120, e.g., the pre-processing module 230, obtains point cloud data collected by the LiDAR 220 on the device 110 to be positioned at the current time.

At block 320, the computing device 120, e.g., the global LiDAR inertial matching module 250, determines, based on the point cloud data and a global map built in a global coordinate system, the global positioning information of the device 110 in the global coordinate system at the current time.

At block 330, the computing device 120, e.g., the LiDAR inertial odometry 240, determines, based on the point cloud data and a local map built in a local coordinate system, the local positioning information of the device 110 in the local coordinate system at the current time.

At block 340, the computing device 120, e.g., the fusion optimization module 260, determines, based on at least the global positioning information and the local positioning information, a positioning result 101 of the device 110 at the current time.

In some embodiments, the positioning result 101 may indicate a pose of the device in the global coordinate system or the local coordinate system at the current time.

In some embodiments, the computing device 120, e.g., the pre-processing module 230, may further obtain inertial measurement data of the device 110 at the current time. The computing device 120, for example, the inertial integration unit 231, may determine, by integrating the inertial measurement data, inertial positioning information of the device 110 in an inertial coordinate system at the current time. The computing device 120, for example, the fusion optimization module 260, may determine the positioning result 101 based on the global positioning information, the local positioning information and the inertial positioning information.

In some embodiments, the computing device 120, e.g., the motion compensation unit 232, may perform motion compensation on the point cloud data based on the inertial positioning information before determining the global positioning information and/or the local positioning information.

In some embodiments, the computing device 120, e.g., the fusion optimization module 260, may determine a posterior probability associated with a plurality of positioning results of the device 110 at a plurality of times, and the plurality of positioning results include at least the positioning result 101 and a historical positioning result of the device 110 at a historical time before the current time; and determine the positioning result 101 by maximizing the posterior probability.

In some embodiments, the computing device 120, e.g., the fusion optimization module 260, may determine a first likelihood value associated with global positioning information; determine a second likelihood value associated with local positioning information; determine a third likelihood value associated with the inertial positioning information; and determine the posterior probability based on at least the first likelihood value, the second likelihood value and the third likelihood value.

In some embodiments, the global positioning information may indicate a first pose of the device 110 in the global coordinate system, and the local positioning information may indicate a second pose of the device 110 in the local coordinate system. The computing device 120 (for example, the fusion optimization module 260) may determine an estimate of the first pose based on the second pose and a transformation relationship between the global coordinate system and the local coordinate system; determine a residual between the estimate and the first pose indicated by the global positioning information; and determine the first likelihood value based on at least the residual.

In some embodiments, the local positioning information may indicate a relative pose of the point cloud data relative to the local map, the second pose of the device 110 in the local coordinate system, and the third pose of the local map in the local coordinate system. The computing device 120, for example, the fusion optimization module 260, may determine an estimate of the relative pose based on the second pose and the third pose; determine a residual between the estimate and the relative pose indicated by the local positioning information; and determine, based on at least the residual, the second likelihood value of the relative pose with respect to the second pose and the third pose.

In some embodiments, the computing device 120, e.g., the fusion optimization module 260, may determine a fourth likelihood value associated with historical global positioning information of the device 110 in the global coordinate system at the historical time; determine a fifth likelihood value associated with historical local positioning information in the local coordinate system at the historical time; determine a sixth likelihood value associated with historical inertial positioning information of the device 110 in the inertial coordinate system at the historical time; and determine the posterior probability based on the first likelihood value, the second likelihood value, the third likelihood value, the fourth likelihood value, the fifth likelihood value and the sixth likelihood value.

In some embodiments, the local map may be built based on at least one frame of point cloud data collected by the LiDAR 220 at historical times before the current time, and the computing device 120, e.g., the LiDAR inertial odometry 240, may update the local map based on the point cloud data.

As can be seen from the above depictions, embodiments of the present disclosure provide a solution for positioning. The solution comprises obtaining point cloud data collected by a LiDAR on a device to be positioned at a current time; determining, based on the point cloud data and a global map built in a global coordinate system, global positioning information of the device in the global coordinate system at the current time; determining, based on the point cloud data and a local map built in a local coordinate system, local positioning information of the device in the local coordinate system at the current time; and determining, based on at least the global positioning information and the local positioning information, a positioning result of the device at the current time. In this way, embodiments of the present disclosure can provide an effective and stable positioning service, so that the positioning result is not affected by environmental changes.

Figure 4:
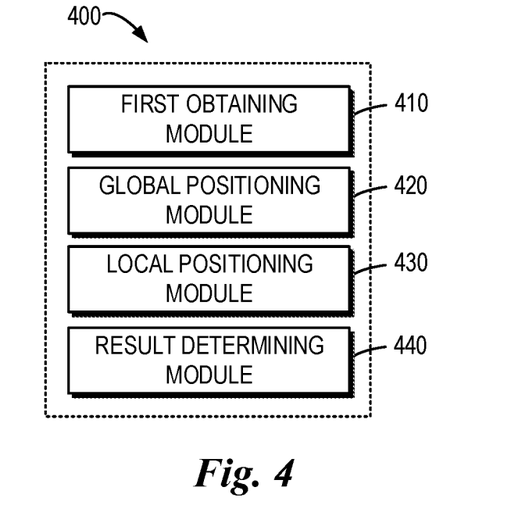
FIG. 4 illustrates a schematic block diagram of a positioning apparatus according to embodiments of the present disclosure.

FIG. 4 illustrates a schematic block diagram of a positioning apparatus 400 according to embodiments of the present disclosure. The apparatus 400 may be included in or implemented as the computing device 120 as shown in FIG. 1. As shown in FIG. 4, the apparatus 400 may include a first obtaining module 410 configured to obtain point cloud data collected by a LiDAR on a device to be positioned at a current time. The apparatus 400 may further include a global positioning module 420 configured to determine, based on the point cloud data and a global map built in a global coordinate system, global positioning information of the device in the global coordinate system at the current time. The apparatus 400 may further include a local positioning module 430 configured to determine, based on the point cloud data and a local map built in a local coordinate system, local positioning information of the device in the local coordinate system at the current time. In addition, the apparatus 400 may further include a result determining module 440 configured to determine, based on at least the global positioning information and the local positioning information, a positioning result of the device at the current time.

In some embodiments, the apparatus 400 further comprises: a second obtaining module configured to obtain inertial measurement data of the device at the current time; and an inertial positioning module configured to determine, by integrating the inertial measurement data, inertial positioning information of the device in an inertial coordinate system at the current time. The result determining module 440 is further configured to determine the positioning result based on the global positioning information, the local positioning information and the inertial positioning information.

In some embodiments, the apparatus 400 further comprises: a motion compensation module configured to perform motion compensation on the point cloud data based on the inertial positioning information before determining the global positioning information and/or the local positioning information.

In some embodiments, the result determining module 440 comprises: a posterior probability determining unit configured to determine a posterior probability associated with a plurality of positioning results of the device at a plurality of times, the plurality of positioning results including at least the positioning result of the device at the current time and a historical positioning result of the device at a historical time before the current time; and a result determining unit configured to determine the positioning result by maximizing the posterior probability.

In some embodiments, the posterior probability determining unit comprises: a first determining subunit configured to determine a first likelihood value associated with the global positioning information; a second determining subunit configured to determine a second likelihood value associated with the local positioning information; a third determining subunit configured to determine a third likelihood associated with the inertial positioning information; and a fourth determining subunit configured to determine the posterior probability based on at least the first likelihood value, the second likelihood value and the third likelihood value.

In some embodiments, the global positioning information indicates a first pose of the device in the global coordinate system, the local positioning information indicates a second pose of the device in the local coordinate system, and the first determining subunit is configured to determine an estimate of the first pose based on the second pose and a transformation relationship between the global coordinate system and the local coordinate system; determine a residual between the estimate and the first pose indicated by the global positioning information; and determine the first likelihood value based on at least the residual.

In some embodiments, the local positioning information indicates a relative pose of the point cloud data relative to the local map, the second pose of the device in the local coordinate system and the third pose of the local map in the local coordinate system, and the second determining subunit is configured to determine an estimate of the relative pose based on the second pose and the third pose; determine a residual between the estimate and the relative pose indicated by the local positioning information; and determine, based on at least the residual, the second likelihood value of the relative pose with respect to the second pose and the third pose.

In some embodiments, the first determining subunit is further configured to determine a fourth likelihood value associated with historical global positioning information of the device in the global coordinate system at the historical time. The second determining subunit is further configured to determine a fifth likelihood value associated with historical local positioning information of the device in the local coordinate system at the historical time. The third determining subunit is further configured to determine a sixth likelihood value associated with historical inertial positioning information of the device in the inertial coordinate system at the historical time. The fourth determining subunit is further configured to determine the posterior probability based on the first likelihood value, the second likelihood value, the third likelihood value, the fourth likelihood value, the fifth likelihood value and the sixth likelihood value.

In some embodiments, the local map is built based on at least one frame of point cloud data collected by the LiDAR at historical times before the current time, and the apparatus 400 further comprises a map updating module configured to update the local map based on the point cloud data.

Figure 5:
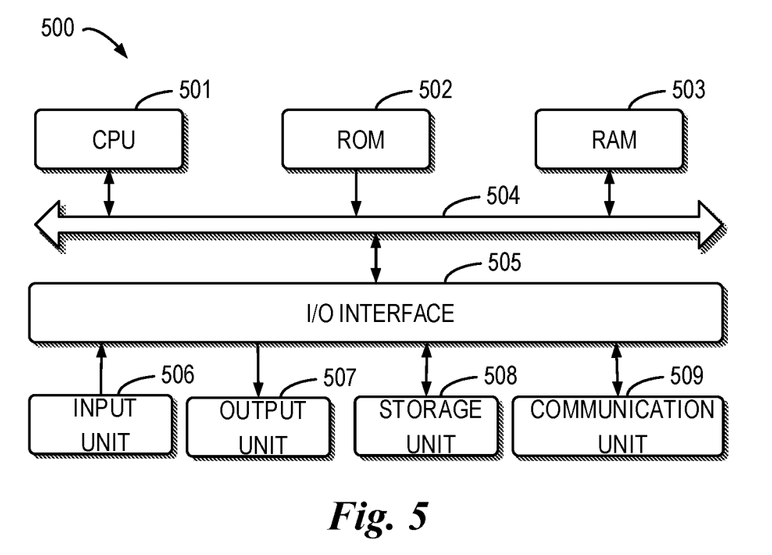
FIG. 5 illustrates a schematic block diagram of a computing device capable of implementing embodiments of the present disclosure.

FIG. 5 shows a schematic block diagram of an example device 500 that may be used to implement embodiments of the present disclosure. The device 500 may be used to implement the computing device 120 as shown in FIG. 1. As shown, the device 500 comprises a central processing unit (CPU) 501 which is capable of performing various proper actions and processes in accordance with computer programs instructions stored in a read only memory (ROM) 502 and/or computer program instructions uploaded from a storage unit 508 to a random access memory (RAM) 503. In the RAM 503, various programs and data needed in operations of the device 500 may be stored. The CPU 501, the ROM 502 and the RAM 503 are connected to one another via a bus 504. An input/output (I/O) interface 505 is also connected to the bus 504.

Multiple components in the device 500 are connected to the I/O interface 505: an input unit 506 including a keyboard, a mouse, or the like; an output unit 507, e.g., various displays and loudspeakers; a storage unit 508 such as a magnetic disk, an optical disk or the like; and a communication unit 509 such as a network card, a modem, a radio communication transceiver. The communication unit 509 allows the apparatus 500 to exchange information/data with other devices via a computer network such as Internet and/or various telecommunication networks.

The processing unit 501 performs various methods and processes described above, such as the process 400. For example, in some embodiments, the process 400 may be implemented as a computer software program that is tangibly embodied on a machine-readable medium, such as the storage unit 508. In some embodiments, part or all of the computer program may be loaded and/or installed on the device 500 via the ROM 502 and/or the communication unit 509. When a computer program is loaded into the RAM 503 and executed by the CPU 501, one or more steps of the process 400 described above may be performed. Alternatively, in other embodiments, the CPU 501 may be configured to perform the process 400 by any other suitable means (e.g., by means of firmware).

The functions described above herein may be performed, at least in part, by one or more hardware logic components. For example, without limitation, exemplary types of hardware logic components that may be used include: Field Programmable Gate Array (FPGA), Application Specific Integrated Circuit (ASIC), Application Specific Standard Product (ASSP), System on Chip (SOC), Load programmable logic device (CPLD) and so on.

The computer program code for implementing the method of the present disclosure may be complied with one or more programming languages. These computer program codes may be provided to a general-purpose computer, a dedicated computer or a processor of other programmable data processing apparatuses, such that when the program codes are executed by the computer or other programmable data processing apparatuses, the functions/operations prescribed in the flow chart and/or block diagram are caused to be implemented. The program code may be executed completely on a computer, partly on a computer, partly on a computer as an independent software packet and partly on a remote computer, or completely on a remote computer or server.

In the context of the present disclosure, the machine-readable medium may be any tangible medium including or storing a program for or about an instruction executing system, apparatus or device. The machine-readable medium may be a machine-readable signal medium or machine-readable storage medium. The machine-readable medium may include, but not limited to, electronic, magnetic, optical, electro-magnetic, infrared, or semiconductor system, apparatus or device, or any appropriate combination thereof. More detailed examples of the machine-readable storage medium include, an electrical connection having one or more wires, a portable computer magnetic disk, hard drive, random-access memory (RAM), read-only memory (ROM), erasable programmable read-only memory (EPROM or flash memory), optical storage device, magnetic storage device, or any appropriate combination thereof.

Besides, although the operations are depicted in a particular order, it should not be understood that such operations are completed in a particular order as shown or in a successive sequence, or all shown operations are executed so as to achieve a desired result. In some cases, multi-task or parallel-processing would be advantageous. Likewise, although the above discussion includes some specific implementation details, they should not be explained as limiting the scope of any disclosure or claims, but should be explained as a description for a particular implementation of a particular invention. In the present description, some features described in the context of separate embodiments may also be integrated into a single implementation. On the contrary, various features described in the context of a single implementation may also be separately implemented in a plurality of embodiments or in any suitable sub-group.

Although the subject matter has been described in language specific to structural features and/or methodological actions, it should be understood that the subject matters specified in the appended claims are not limited to the specific features or actions described above. Rather, the specific features and actions described above are disclosed as example forms of implementing the claims.

We claim:

1. A method, comprising:
   obtaining point cloud data collected by a LiDAR on a device at a first time;
   determining, based on the point cloud data and a global map built in a global coordinate system, first global positioning information of the device in the global coordinate system at the first time;
   determining, based on the point cloud data and a first local map built in a local coordinate system, first local positioning information of the device in the local coordinate system at the first time, wherein the first local map includes a number of frames of historical point cloud and is updated by incorporating the point cloud data at the first time until the number of frames reaches a threshold;
   determining, based on at least the first global positioning information and the first local positioning information, a first positioning result of the device at the first time;
   in a case that the number of frames in the first local map reaches the threshold, building a second local map by incorporating the point cloud data and frames of point cloud data after the first time; and
   in a case that a number of frames in the second local map reaches the threshold, discarding the first local map.

2. The method of claim 1, wherein determining the first positioning result comprises:
   obtaining inertial measurement data of the device at the first time;
   determining, by integrating the inertial measurement data, first inertial positioning information of the device in an inertial coordinate system at the first time; and
   determining the first positioning result based on the first global positioning information, the first local positioning information and the first inertial positioning information.

3. The method of claim 2, further comprising:
   performing motion compensation on the point cloud data based on the first inertial positioning information before at least one of the determining the first global positioning information and the determining the first local positioning information.

4. The method of claim 2, wherein the determining the first positioning result comprises:
   determining a posterior probability associated with a plurality of positioning results of the device at a plurality of times, the plurality of positioning results including at least the first positioning result of the device at the first time and a second positioning result of the device at a second time before the first time; and
   determining the first positioning result by maximizing the posterior probability.

5. The method of claim 4, wherein determining the posterior probability comprises:
   determining a first likelihood value associated with the first global positioning information;
   determining a second likelihood value associated with the first local positioning information;
   determining a third likelihood value associated with the first inertial positioning information; and
   determining the posterior probability based on at least the first likelihood value, the second likelihood value and the third likelihood value.

6. The method of claim 5, wherein the first global positioning information indicates a first pose of the device in the global coordinate system, the first local positioning information indicates a second pose of the device in the local coordinate system, and the determining the first likelihood value comprises:
   determining an estimate of the first pose based on the second pose and a transformation relationship between the global coordinate system and the local coordinate system;
   analyzing the estimate and the first pose indicated by the first global positioning information; and
   determining the first likelihood value based on a result of the analyzing.

7. The method of claim 5, wherein the first local positioning information indicates a relative pose of the point cloud data relative to the first local map, a second pose of the device in the local coordinate system, and a third pose of the first local map in the local coordinate system, and
   wherein the determining the second likelihood value comprises:
      determining an estimate of the relative pose based on the second pose and the third pose;
      analyzing the estimate and the relative pose indicated by the first local positioning information; and
      determining, based on at least a result of the analyzing, the second likelihood value of the relative pose with respect to the second pose and the third pose.

8. The method of claim 5, wherein determining the posterior probability comprises:
   determining a fourth likelihood value associated with a second global positioning information of the device in the global coordinate system at the second time;
   determining a fifth likelihood value associated with a second local positioning information of the device in the local coordinate system at the second time;
   determining a sixth likelihood value associated with a second inertial positioning information of the device in the inertial coordinate system at the second time; and
   determining the posterior probability based on the first likelihood value, the second likelihood value, the third likelihood value, the fourth likelihood value, the fifth likelihood value and the sixth likelihood value.

9. The method of claim 1, wherein the first positioning result indicates a pose of the device in one or more of the global coordinate system or the local coordinate system at the first time.

10. A non-transitory computer-readable storage medium having stored thereon a computer program that, when executed by a computing device, causes the computing device to perform:
- obtaining point cloud data collected by a LiDAR on an object at a first time;
- determining, based on the point cloud data and a global map built in a global coordinate system, first global positioning information of the object in the global coordinate system at the first time;
- determining, based on the point cloud data and a first local map built in a local coordinate system, first local positioning information of the object in the local coordinate system at the first time, wherein the first local map includes a number of frames of historical point cloud and is updated by incorporating the point cloud data at the first time until the number of frames reaches a threshold;
- determining, based on at least the first global positioning information and the first local positioning information, a first positioning result of the object at the first time;
- in a case that the number of frames in the first local map reaches the threshold, building a second local map by incorporating the point cloud data and frames of point cloud data after the first time, and
- in a case that a number of frames in the second local map reaches the threshold, discarding the first local map.

11. A computing device, comprising:
- one or more processors; and
- a memory for storing one or more programs which, when executed by the one or more processors, cause the computing device to perform acts comprising:
  - obtaining point cloud data collected by a LiDAR on a device at a first time;
  - determining, based on the point cloud data and a global map built in a global coordinate system, first global positioning information of the device in the global coordinate system at the first time;
  - determining, based on the point cloud data and a first local map built in a local coordinate system with, first local positioning information of the device in the local coordinate system at the first time, wherein the first local map includes a number of frames of historical point cloud and is updated by incorporating the point cloud data at the first time until the number of frames reaches a threshold;
  - determining, based on at least the first global positioning information and the first local positioning information, a first positioning result of the device at the first time;
  - in a case that the number of frames in the first local map reaches the threshold, building a second local map by incorporating, the point cloud data and frames of point cloud data after the first time; and
  - in a case that a number of frames in the second local map reaches the threshold, discarding the first local map.

12. The computing device of claim 11, wherein the determining the first positioning result comprises:
- obtaining inertial measurement data of the device at the first time;
- determining, by integrating the inertial measurement data, first inertial positioning information of the device in an inertial coordinate system at the first time; and
- determining the first positioning result based on the first global positioning information, the first local positioning information and the inertial positioning information.

13. The computing device of claim 12, wherein the acts further comprise:
- performing motion compensation on the point cloud data based on the first inertial positioning information before at least one of the determining the first global positioning information and the determining the first local positioning information.

14. The computing device of claim 12, wherein the determining the first positioning result comprises:
- determining a posterior probability associated with a plurality of positioning results of the device at a plurality of times, the plurality of positioning results including at least the first positioning result of the device at the first time and a second positioning result of the device at a second time before the first time; and
- determining the first positioning result by maximizing the posterior probability.

15. The computing device of claim 14, wherein the determining the posterior probability comprises:
- determining a first likelihood value associated with the first global positioning information;
- determining a second likelihood value associated with the first local positioning information;
- determining a third likelihood value associated with the first inertial positioning information; and
- determining the posterior probability based on at least the first likelihood value, the second likelihood value and the third likelihood value.

16. The computing device of claim 15, wherein the first global positioning information indicates a first pose of the device in the global coordinate system, the first local positioning information indicates a second pose of the device in the local coordinate system, and the determining the first likelihood value comprises:
- determining an estimate of the first pose based on the second pose and a transformation relationship between the global coordinate system and the local coordinate system;
- analyzing the estimate and the first pose indicated by the global positioning information; and
- determining the first likelihood value based on at least a result of the analyzing.

17. The computing device of claim 15, wherein the first local positioning information indicates a relative pose of the point cloud data relative to the first local map, a second pose of the device in the local coordinate system, and a third pose of the first local map in the local coordinate system, and
wherein the determining the second likelihood value comprises:
- determining an estimate of the relative pose based on the second pose and the third pose;
- analyzing the estimate and the relative pose indicated by the first local positioning information; and
- determining, based on at least a result of the analyzing, the second likelihood value of the relative pose with respect to the second pose and the third pose.

18. The computing device of claim 15, wherein the determining the posterior probability comprises:

determining a fourth likelihood value associated with a second global positioning information of the device in the global coordinate system at the second time;
determining a fifth likelihood value associated with a second local positioning information of the device in the local coordinate system at the second time;
determining a sixth likelihood value associated with a second inertial positioning information of the device in the inertial coordinate system at the second time; and
determining the posterior probability based on the first likelihood value, the second likelihood value, the third likelihood value, the fourth likelihood value, the fifth likelihood value and the sixth likelihood value.

* * * * *